United States Patent [19]

Matthias

[11] 4,176,921

[45] Dec. 4, 1979

[54] EYEGLASSES HAVING REMOVABLE LENSES

[75] Inventor: Jan H. Matthias, Greispinzgau, Austria

[73] Assignee: Carrera International Corporation, Norwood, N.J.

[21] Appl. No.: 912,022

[22] Filed: Jun. 2, 1978

[30] Foreign Application Priority Data

Jun. 3, 1977 [DE] Fed. Rep. of Germany ... 7717685[U]

[51] Int. Cl.² .................. G02B 5/13; G02B 21/26; G02B 7/04
[52] U.S. Cl. .................. 351/106; 351/86; 2/443; 351/47
[58] Field of Search ............. 351/106, 126, 154, 86, 351/47, 48, 133; 2/443, 142

[56] References Cited

U.S. PATENT DOCUMENTS

| | | | |
|---|---|---|---|
| 807,944 | 12/1905 | Mirovitch | 160/261 |
| 955,278 | 4/1910 | Minor | 351/62 |
| 2,607,919 | 8/1952 | Stegeman | 2/14 |
| 2,738,709 | 3/1956 | Matthews et al. | 351/86 |
| 2,975,427 | 3/1961 | Sick | 2/14 |
| 3,229,303 | 1/1966 | Jonassen | 2/14 |
| 3,233,250 | 2/1966 | Jonassen | 2/14 |
| 4,056,853 | 11/1977 | Bottazzini et al. | 2/443 |

FOREIGN PATENT DOCUMENTS

273732 2/1951 Switzerland .............................. 351/47

Primary Examiner—John K. Corbin
Assistant Examiner—Rodney B. Bovernick
Attorney, Agent, or Firm—Fitch, Even & Tabin

[57] ABSTRACT

Eyeglasses of the type which permit interchanging of lenses are disclosed which employ a support frame having a plurality of support prongs thereon adapted to receive a pair of lenses in supporting relation on the frame, and including a retaining clip pivotally mounted on the frame and movable between a first position which permits easy mounting of lenses on and removal from the support frame, and a second position wherein the retaining clip retains the lenses in mounted relation on the support frame so as to prevent their removal.

15 Claims, 5 Drawing Figures

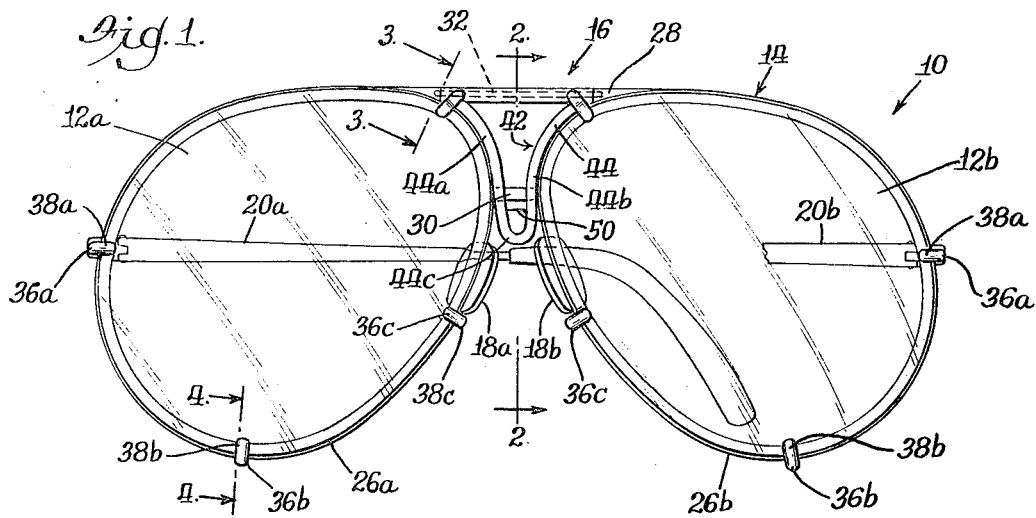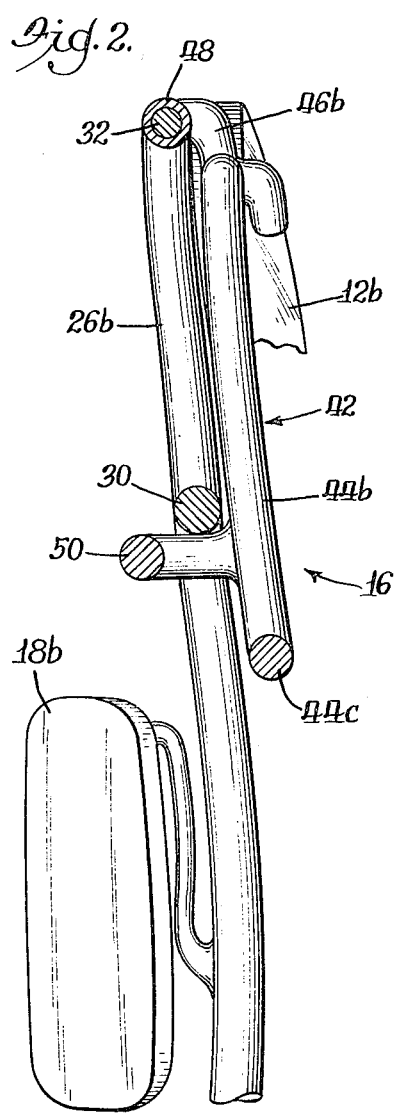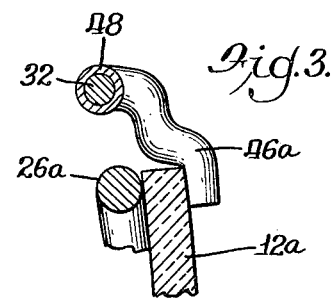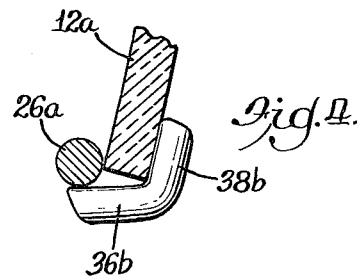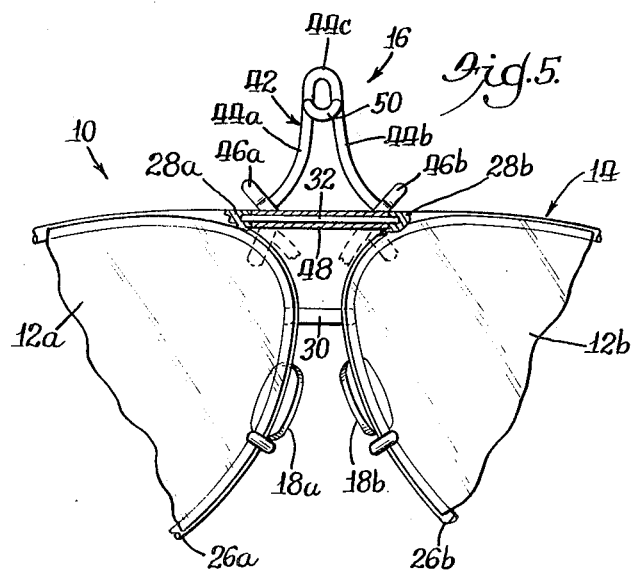

EYEGLASSES HAVING REMOVABLE LENSES

The present invention relates generally to eyeglasses or spectacles, and more particularly to eyeglasses having novel structural features facilitating interchanging of lenses in a relatively quick and easy manner.

Eyeglasses of the type which permit interchanging of lenses to optimize use under varying light conditions, such as varying sun conditions, are generally known. Such interchangeability of lenses finds particular application in eyeglasses or spectacles worn as sunglasses or protective glasses in certain sporting activities such as skiing, cycling, automobile racing and the like to permit lens replacement for varying sun conditions and for replacement of damaged lenses. Various techniques have been devised for releasably retaining interchangeable lenses on eyeglass support frames. For the most part, however the known eyeglass or spectacle designs which permit interchanging of lenses have significant drawbacks. For example, the known eyeglass designs having provision for interchanging or replacement of the lenses are generally of complex construction and therefore relatively expensive to manufacture. Additionally, the interchangeable lens type eyeglasses generally require time consuming selective manipulation of a support frame and associated structure with coordinated manipulation of the lens or lenses in order to mount the lenses on the support frame or remove them therefrom. This required manipulation is particularly a drawback in cold or inclement weather where such manipulation frequently results in dropping a lens or bending or breaking the support frame, with consequent inconvenience and higher expense to the user.

One of the primary objects of the present invention is to provide novel eyeglasses of the type which permit replacement of lenses and which overcome the aforementioned drawbacks in the prior art eyeglasses.

Another object of the present invention is to provide novel eyeglasses which facilitate interchanging of lenses without significant manipulation or deforming of a support frame or the lenses while mounting lenses on or removing them from the support frame.

A more particular object of the present invention is to provide novel eyeglasses of the type which permit interchanging of lenses, which eyeglasses employ a frame having a pair of laterally spaced lens support sections interconnected through a bridge, each of the lens support sections having a plurality of support prongs thereon adapted to receive a lens in supporting relation, and including a retaining clip pivotally mounted on the frame and movable between a first positon which permits mounting of lenses on and removal from the lens support sections, and a second position retaining the lenses in mounted relation on the lens support sections so as to prevent removal therefrom.

A still further object of the invention is to provide a frame support for releasably mounting lenses of predetermined size, which frame includes a novel arrangement of support prongs and a retaining clip cooperable to support lenses on the frame and permit easy removal therefrom.

A feature of the eyeglasses in accordance with the present invention lies in the provision of auxiliary retaining or support prongs mounted on the retaining clip and cooperable with the lens support sections to retain the lenses in mounted relation thereon when the retaining clip is in its second or closed position.

A further feature lies in the provision of a locking arm on the retaining clip for releasably locking the retaining clip in its second position so as to prevent inadvertent movement to a position which would permit accidental release of the lenses from their lens support sections.

Further objects and advantages of the present invention, together with the organization and manner of operation thereof, will become apparent from the following detailed description of the invention when taken in conjunction with the accompanying drawing wherein like reference numerals designate like elements throughout the several views, and wherein:

FIG. 1 is a front elevational view of eyeglasses constructed in accordance with a preferred embodiment of the present invention;

FIG. 2 is a fragmentary sectional view, on an enlarged scale, taken substantially along line 2—2 of FIG. 1, looking in the direction of the arrows;

FIG. 3 is a fragmentary sectional view, on an enlarged scale, taken substantially along line 3—3 of FIG. 1, looking in the direction of the arrows;

FIG. 4 is a fragmentary sectional view, on an enlarged scale, taken substantially along line 4—4 of FIG. 1, looking in the direction of the arrows; and FIG. 5 is a fragmentary elevational view of the eyeglasses of FIG. 1, showing the retaining clip in a pivotally raised position to permit removal and replacement of lenses on the support frame.

Referring now to the drawing, and in particular to FIG. 1, a pair of eyeglasses or spectacles constructed in accordance with a preferred embodiment of the present invention is indicated at 10. The eyeglasses 10 are of the type which permit interchanging of the lenses. Very generally, the eyeglasses or spectacles 10 include a pair of equal size lenses 12a and 12b which are adapted to be releasably supported on frame means 14 and retained thereon by retaining clip means 16 pivotally mounted on the frame means. Means including a pair of nosepieces 18a and 18b and a pair of temple pieces 20a and 20b are mounted on the frame means 14 in a conventional manner and facilitate mounting of the eyeglasses on the wearer's nose with the temple pieces cooperating with the wearer's ears to maintain the eyeglasses in predetermined relation to the wearer's eyes, as is known. As will be described in greater detail hereinafter, support means are mounted on the frame means to releasably support the lenses, and the retaining clip means is movable between a first position which permits mounting of the lenses on and removal from the support frame means, and a second position adapted to retain the lenses on the support frame means so as to prevent removal of the lenses from the support frame.

In the illustrated embodiment, the lenses 12a and 12b are generally oval or egg-shaped in plan configuration to provide a wide field of vision. The lenses 12a, b are interchangeable with similarly shaped lenses and are preferably polarized to provide the desired protection against ultraviolet rays. Normally, the eyeglasses 10 would be provided with at least two pairs of interchangeable lenses each pair of which could provide a different desired effect under different sun or usage conditions.

The frame means 14 defines a pair of symmetrically shaped lens support frame sections 26a and 26b which, as best seen in FIG. 1, define closed loop rims shaped to correspond to the outer peripheral edge configurations of the corresponding lenses 12a, b so that when the lenses are mounted on the support sections the peripheral edges of the lenses are disposed in juxtaposed relation to the lens support sections. The lens support sections 26a, b are preferably made from a relatively lightweight metallic material, such as a suitable gage wire stock, and are interconnected through bridge means including upper and lower bridge members 28 and 30, respectively. It will be appreciated that the lens support sections may be made of other materials such as plastic and may be formed integral with bridge means therebetween.

In the illustrated embodiment, the upper bridge member 28 includes a pair of endpieces 28a and 28b which are secured, respectively, to the upper edges of the corresponding lens support sections 26a, b and have a hinge pin 32 secured at its opposite ends to the endpieces 28a, b. The lower bridge member 30 is secured at its opposite ends to the lens support sections 26a, b and, as will be described more fully hereinbelow, is cooperable with the retainer clip means 16 to releasably retain the retaining clip means in its closed or lens retaining position relative to the frame means 14.

The nosepieces 18a and 18b may be mounted on the lens support sections 26a, b, respectively, in any suitable known manner, the nosepieces preferably having articulated motion relative to the frame means so as to orient themselves to the configuration of the wearer's nose, as is known. Alternatively, the nosepieces could be fixedly mold formed with the support frame 14 if made from plastic or similar mold or die formed material. The temple pieces 20a, b may be hingedly connected to the opposite outer lateral edges of the lens support sections 26a, b in a conventional manner, preferably at approximately the horizontal center axis, of the eyeglasses.

In accordance with an important feature of the present invention, support means in the form of a plurality of support prongs or tabs are mounted on each of the lens support sections 26a, b and are strategically located to facilitate supporting relation with the associated lenses 12a, b when mounted on the lens support sections. In the illustrated embodiment, three identical metallic support prongs 36a, b and c are mounted on each of the lens support sections 26a, b, the support prongs 36a being mounted adjacent the hinge connections of the temple pieces 20a, b on the lens support sections so as to receive a lateral edge of a lens, the support prongs 36b being mounted at the lower edges of the respective lens support sections so as to receive the lower edge of the lens, and the support prongs 36c being mounted generally laterally opposite the respective support prongs 36a but below a line connecting the support prongs 36a so as to receive the opposite lateral edge of the corresponding lens.

As best seen in FIG. 4, and with the support prong 36b being representative of the identical support prongs 36a, b and c, each support prong comprises a generally L-shaped finger having one end secured to the associated lens support section 26a, b, as by soldering, and having its opposite end defining a finger or prong portion 38a, b or c, which is directed generally toward the center of the associated lens 12a, b and being spaced from the associated lens support section a distance sufficient to receive the peripheral edge of the corresponding lens in supporting relation therewith. The support prongs 36a, b and c are positioned on their respective lens support sections 26a, b so that an associated lens 12a, b may be readily inserted into the support prongs and supported thereby when the support frame and lenses are disposed in generally upstanding position as illustrated in FIG. 1. The support prongs will thus support the lenses freely on the lens support sections without having to manually hold the lenses after they have been inserted in the described manner.

Referring now particularly to FIGS. 2, 3 and 5, taken in conjunction with FIG. 1, the retaining clip means 16 includes a retaining clip 42 having a generally U-shaped portion 44 the leg portions 44a and 44b of which are contoured generally similarly to the juxtaposed portions of the lens support frame sections 26a, b. The leg portions 44a, b are secured at their upper ends to a pair of auxiliary support and retaining prongs 46a and 46b which, in turn, are secured to a hinge tube 48 pivotally mounted on the hinge bin 32. In this manner, the retainer clip 42 is hingedly mounted on the frame means 14 intermediate the lens support sections 26a, b and is movable between a first position spaced from the lens support sections, as shown in FIG. 5, to permit mounting of the lenses 12a, b on the lens support sections or removal therefrom, and a second position wherein the retaining prongs 46a, b retain lenses mounted on the lens support sections so as to prevent removal of the lenses, as best seen in FIGS. 1 and 3. To this end, the retaining prongs 46a, b are configured to engage the adjacent outer peripheral surfaces of the lenses 12a, b when the retaining clip 42 is disposed in its second or downward pivotal position.

To releasably retain the retaining clip 42 in a position wherein the retaining prongs 46a, b retain the lenses 12a, b on the respective lens support sections 26a, b, a generally U-shaped locking arm 50 is secured at its opposite ends to the retaining clip 42 so as to extend in generally normal relation to the plane of the clip 42. The locking arm 50 is positioned so as to frictionally engage the lower bridge member 30 in a snap-like action when the retaining clip 42 is moved to its downward pivotal position. The lower end 44c of the U-shaped retainer clip portion 44 extends below the locking arm 50 and provides a readily accessible means by which the retaining clip may be grasped to pivot it upwardly facilitating removal and replacement of the lenses.

Having thus described a preferred embodiment of the eyeglasses 10 in accordance with the present invention, it can be seen that by moving the retaining clip means 16 to an upward pivotal position relative to the frame means 14, as illustrated in FIG. 5, the lenses 12a, b may be readily removed from their mounting relation with the lens support sections 26a, b by moving the lenses in planes generally parallel to the planes of the respective lens support sections. A single replacement lens or pair of different lenses may then be mounted on the lens support sections with the support prongs 36a, b and c providing full support for the lenses when the retaining clip 42 is in its open position. After interchanging lenses on the lens support sections 26a, b, the retaining clip 42 is pivoted downwardly to effect locking relation of the locking arm 50 with the lower bridge member 30 so that the associated retaining prongs 46a, b engage the adjacent peripheral edges of the lenses and retain them in fixed mounted relation on the support frames 26a, b.

Thus, in accordance with the present invention, eyeglasses of the type which permit easy interchanging of the lenses are provided which do not require bending manipulation or distortion of either the support frames or the lenses. The support frame and lenses are thus not subjected to undesirable strain which might tend to damage or lead to complete failure as by fracture. Moreover, the pivotally mounted retaining clip 42 may be readily actuated by one hand while holding the frame means 14 with the other hand. While continuing to hold the frame means 14 with one hand, the operator can, after having opened the retaining clip replace the lenses 12 and again pivotally move the retaining clip to a locking position without having had to release the frame from his other hand.

While a preferred embodiment of the present invention has been illustrated and described, it will be understood to those skilled in the art that changes and modifications may be made therein without departing from the invention in its broader aspects.

Various features of the invention are defined in the following claims.

What is claimed is:

1. Eyeglasses of the type having removable lenses, comprising, a pair of lenses, frame means defining a pair of lens support sections and including bridge means interconnecting said lens support sections in laterally spaced relation, means cooperative with said frame means and adapted to facilitate mounting of the eyeglasses on the wearer in predetermined relation to the wearer's eyes, support means mounted on each of said lens support sections and adapted to releasably support a separate lens in supporting relation thereon, and a retaining clip mounted on said frame means intermediate said lens support sections and movable between a first position which permits mounting said lenses on and removal from said lens support sections in supported relation with said support means, and a second position adapted for cooperation with said separate lenses to retain said lenses in supported relation on said lens support means so as to prevent removal of said lenses therefrom.

2. Eyeglasses as defined in claim 1 wherein said retaining clip is pivotally mounted on said frame means and has locking arm means thereon adapted for releasable locking engagement with said frame means when said retaining clip is in its said second position.

3. Eyeglasses as defined in claim 1 wherein said support means includes a plurality of support prongs mounted on each of said lens support sections, said support prongs being positioned for cooperation with the peripheral edge of one of said lenses in supporting relation therewith when the lens is placed on the associated lens support section with said retaining clip in its said first position.

4. Eyeglasses as defined in claim 3 wherein said lenses define lower and lateral edges thereon, said support prongs being located on said lens support sections for engagement with said lower and lateral edges of each of said lenses so that each lens may be mounted on and removed from its associated lens support section by movement thereof in a plane substantially parallel to the plane of the associated lens support section when said retaining clip is in its said first position.

5. Eyeglasses as defined in claim 4 wherein each of said support prongs has an end portion directed generally toward the center of a lens when supported on the associated lens support section, each of said prong end portions being spaced outwardly from its associated lens support section a distance sufficient to receive the peripheral edge portion of a lens in supported relation therein.

6. Eyeglasses as defined in any one of claims 3 or 5 wherein said retaining clip includes a pair of auxiliary retaining prongs adapted for cooperation with said lenses when mounted on said lens support sections, said auxiliary prongs cooperating with said support prongs on the associated lens support sections to prevent removal of said lenses therefrom when said retaining clip is in its said second position.

7. Eyeglasses as defined in claim 4 including three support prongs mounted on each of said lens support sections.

8. Eyeglasses as defined in claim 1 wherein each of said lens support sections comprises a closed loop rim having a configuration adapted for engagement with the full peripheral edge of a corresponding one of said lenses when mounted thereon.

9. Eyeglasses as defined in claim 1 wherein said means facilitating mounting of said eyeglasses on a wearer include nosepiece means adapted for engagement with the wearer's nose, and temple members adapted for cooperation with the wearer's ears.

10. Eyeglasses as defined in claim 2 wherein said bridge means includes an upper and a lower bridge member extending between said lens support sections, said retaining clip being pivotally connected to the upper bridge member and having a generally U-shaped portion adapted for juxtaposed relation with portions of said lens support sections when in said second position and being contoured generally similar to said juxtaposed portions of said lens support sections, said retaining clip having a locking arm thereon adapted for releasable locking relation with said lower bridge member when said retaining clip is in its said second position.

11. An eyeglass frame for supporting a pair of lenses of predetermined size in a manner which permits removal of the lenses for cleaning or interchanging with similar size lenses, said frame defining a pair of lens support sections interconnected in laterally spaced relation, means mounted on said frame for cooperation with the wearer's nose and ears to position said lens support sections in desired relation to the wearer's eyes, each of said lens support sections having a plurality of support prongs mounted thereon adapted to releasably receive a lens of said predetermined size in supporting relation therewith, and a retainer clip pivotally mounted on said frame intermediate said lens support sections and movable between a first position which permits mounting of lenses of said predetermined size on and removal from said lens support prongs, and a second position having cooperation with lenses when mounted on said lens support prongs so as to prevent removal of the lenses from said lens support sections.

12. An eyeglass frame as defined in claim 11 wherein said lens support sections each define a closed loop rim having a configuration similar to the outer peripheral edge configuration of a lens to be mounted thereon.

13. An eyeglass frame as defined in claim 11 wherein said retaining clip includes a pair of auxiliary retaining prongs adapted to engage a pair of lenses mounted on said lens support sections so as to prevent removal of the lenses from said lens support sections when said retaining clip is in said second position.

14. An eyeglass frame as defined in claim 11 wherein said retaining clip means includes locking means adapted for cooperation with said frame to releasably maintain said retaining clip in said second position.

15. An eyeglass frame as defined in claim 11 including bridge means interconnecting said lens support sections, said retainer means comprising a retainer clip hingedly mounted on said bridge means intermediate said lens support sections and being configured to facilitate grasping by the wearer's finger to move it from its said second to its said first position.

* * * * *